June 11, 1946.  W. CASTEDELLO  2,401,746
RANGE FINDER
Filed July 19, 1944  2 Sheets-Sheet 1
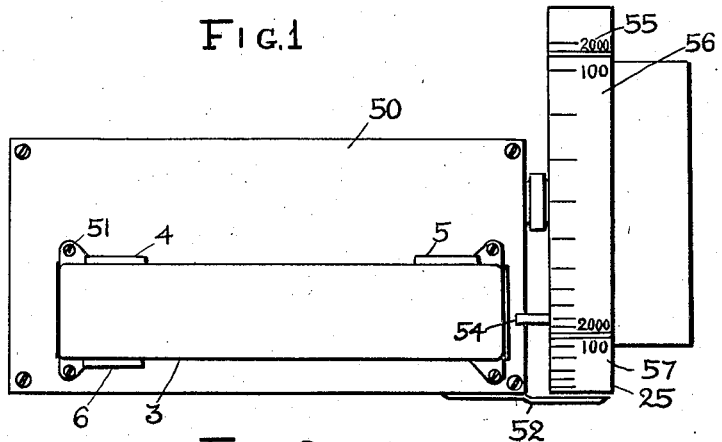
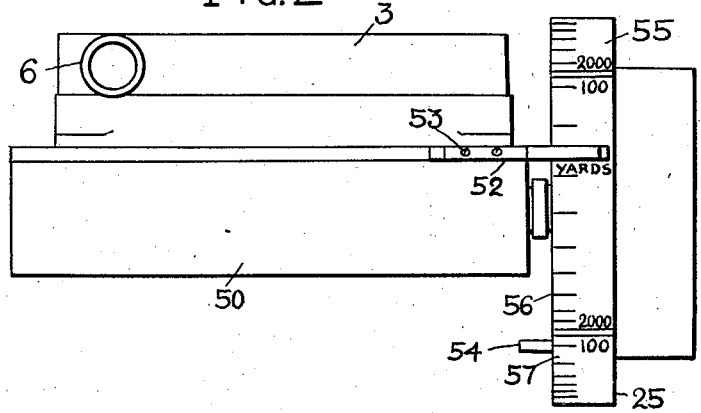
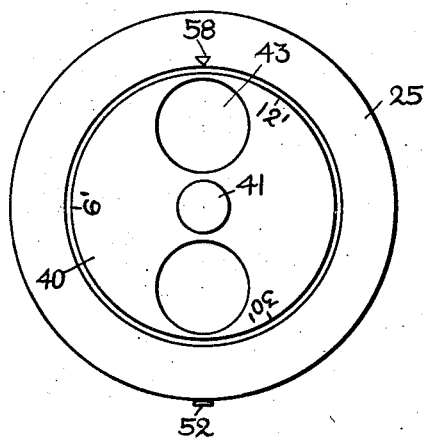
WILLIAM CASTEDELLO
INVENTOR June 11, 1946.  W. CASTEDELLO  2,401,746
RANGE FINDER
Filed July 19, 1944  2 Sheets-Sheet 2
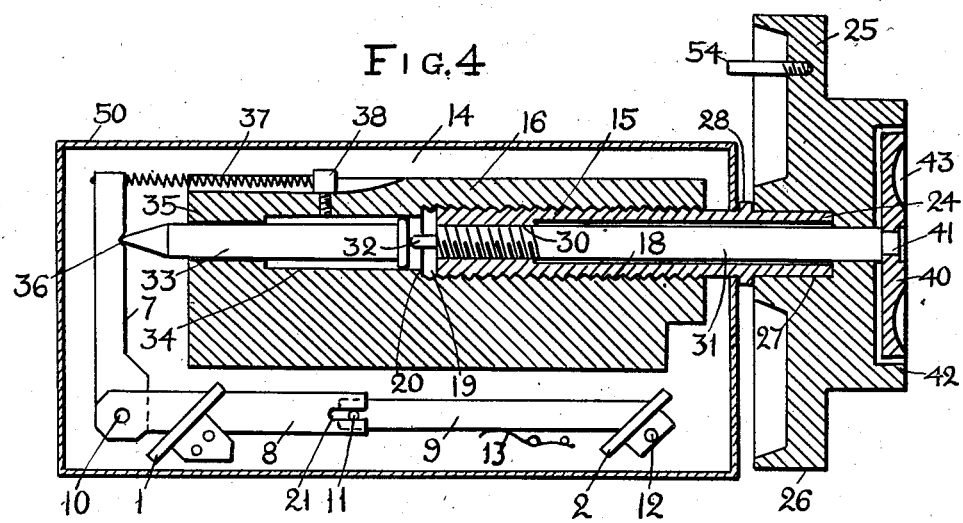
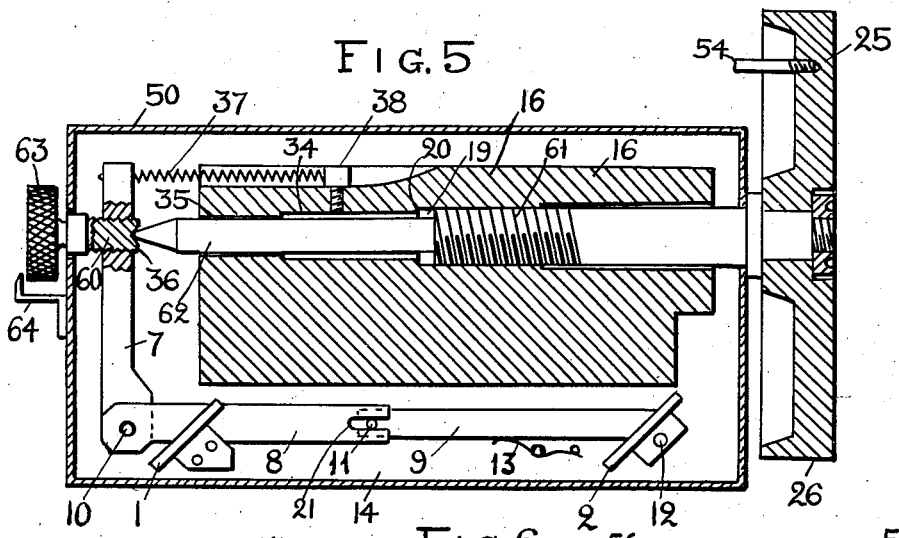
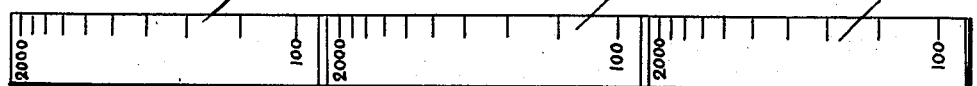
WILLIAM CASTEDELLO
INVENTOR Patented June 11, 1946

2,401,746

UNITED STATES PATENT OFFICE 2,401,746

RANGE FINDER

William Castedello, Stamford, Conn., assignor to The Kalart Company, Inc., Stamford, Conn.

Application July 19, 1944, Serial No. 545,600

9 Claims. (Cl. 88—2.4)

My invention relates to improvements in rangefinders for measuring the distance between an object and an operator, particularly to improvements in rangefinders comprising a stationary reflecting means and an adjustable reflecting means, each of these means being arranged to reflect one image of the object to be observed, the image reflected by the adjustable reflecting means being projected upon the stationary reflecting means.

In order to measure the distance between an object and the position of an operator, the operator will observe the two images of the object as visible on the stationary reflecting means and adjust the angular position of the adjustable reflecting means so that the image projected by this reflecting means is brought into a predetermined relative position to the second image reflected by the stationary reflecting means. The angular position of the adjustable reflecting means being indicative of the distance between the object and the operator is then used to ascertain the distance to be determined, for example by means of indicating means, preferably calibrated in units of range or distance.

According to a method and system well known in the art the reflecting means are adjusted so that the correct distance is indicated when the two reflected images appear superimposed to an operator observing the stationary reflecting means. Rangefinders of this particular type are frequently used in photographic work to facilitate the focusing of the camera lens. The range within which rangefinders based on the "superimposing image" system are reasonably accurate is limited to a distance up to a few hundred yards. This limited range is substantially due to the fact that the base of the rangefinder is a very short one usually about a few inches. Hence light beams reaching the reflecting means from an object located beyond a certain distance are practically parallel and the two images will appear to be superimposed for any distance beyond a certain range. Such limitation of range is without importance for use of the rangefinder in photographic work since the range of accuracy extends far beyond the infinity position of a camera lens. However for various other purposes where a substantially greater range is required rangefinders based on the "superimposed image" or similar systems cannot be used.

It has been proposed to increase the range of accuracy of rangefinders of the type generally described above in cases where at least one dimension of the object is known by adjusting the angular positions of the adjustable reflecting means and the calibration of the indicating means so that the two images of an object appear to an observer in an end to end position instead of superimposed when the rangefinder is set for the range of the object. It has been found that with this method accurate results may be obtained within a range that is a multiple of the range which can be accurately covered with a conventional rangefinder using superimposed images. However, it should be understood that a such long distance rangefinder can be used only for measuring the range of an object known to have the dimension for which the rangefinder has been calibrated.

One of the features and advantages of my invention is to provide a novel and improved long distance rangefinder of the type described for measuring the range of objects having different sizes at least one dimension of which is known.

Another of the features and advantages of my invention is to provide novel and improved means for adjusting the rangefinder corresponding to the known dimension of the object the distance of which is to be measured.

Another of the features and advantages of my invention is to provide a rangefinder of the type described which can be conveniently calibrated, is simple and accurate in operation and which can be manufactured at low costs.

Other and further features and advantages of my invention will appear hereinafter and in the appended claims forming part of the application.

In the accompanying drawings several embodiments of the invention are shown by way of illustration and not by way of limitation.

Fig. 1 is a diagrammatic plan view of a rangefinder according to the invention;

Fig. 2 is an elevational side view of Fig. 1;

Fig. 3 is a side view of Fig. 1 seen from the right;

Fig. 4 shows a sectional plan view of a rangefinder according to the invention on an enlarged scale;

Fig. 5 shows a sectional plan view of a modification of a rangefinder according to the invention, and Fig. 6 is a development of the scales of the indicating means.

A rangefinder according to the invention comprises a stationary semi-transparent reflector 1 for example a mirror made semi-transparent by silver coating the surface of the mirror only partially or thinly and a pivotal reflector 2 having a solidly silvered surface. Both the mirrors are arranged in a case 3 having two windows 4 and 5 in front of the mirrors and an observation window 6 in the rear of the case through which the two images reflected upon mirror 1 may be observed. The angular position of pivotal mirror 2 relative to the stationary mirror is controlled by means of a pivotal lever 7 with which mirror 2 is coupled either directly or preferably through intermediate levers 8 and 9. Lever 8 is rigidly connected to lever 7 so that a pivotal movement of lever 7 will result in a corresponding movement of lever 8. For this purpose both levers may be rigidly mounted on a common pivot 10 or be integral with each other. The free end of lever 8 engages lever 9, for example by means of a projection or lug 11 provided on lever 9 and a fork 21 provided on lever 8. A spring 13 fastened to a base plate 14 may be provided to prevent any play between levers 8 and 9. Lever 9 is pivotal about a pivot 12 and supports pivotal mirror 2. Hence a pivotal movement of lever 7 will cause corresponding pivotal movement of mirror 2. The length and the pivot points of the various levers are adjusted so that the angular movements of mirror 2 are substantially smaller than the angular movements of lever 7, in other words, the intermediate levers 8 and 9 form a step-down transmission. Such an arrangement or any similar arrangement has the advantage that the required very slight angular movements of mirror 2, can be controlled by substantially larger movements of lever 7, it being rather difficult in practice to cause very small angular movements of a lever such as lever 7.

Lever 7 is controlled by means of a screw drive comprising a tubular screw 15 threaded into a block 16 fastened to the base plate 14 by any suitable means. The threaded bore 18 provided in block 16 is deep enough to allow for a clearance 19 between the end of tubular screw 15 and the bottom 20 of threaded bore 18. The upper end 24 of screw 15 which is preferably smooth supports a knob 25 the periphery 26 of which is calibrated as will be explained more fully hereinafter. The end section 24 is tightly fitted into a bore 27 of knob 25 which preferably abuts against a collar 28 provided on end section 24. Tubular screw 15 has an inner thread 30 which may be limited to part of the inner walls of the tubular screw. A shaft 31 having a corresponding outer thread is threaded into thread 30. The inner end of shaft 31 engages, preferably by means of a nose 32, one end of a pin 33 which is passed through a hole 34, provided in block 16 in alignment with bore 18. Section 35 of hole 34 has preferably a diameter only slightly wider than the diameter of pin 33 to serve as bearing for this pin. The other end of pin 33 which is preferably pointed engages lever 7 in which a rounded bearing point 36 may be provided to obtain a secure engagement of lever 7 by pin 33 and to permit a pivotal movement of lever 7. A spring 37 fastened at one end to lever 7 and at the other end to a pin or screw 38 inserted in block 16 or to the block directly urges lever 7 against pin 33. The outer end of shaft 31 supports an inner disc or dial 40 rigidly fastened to shaft 31 for example by means of a screw or nut 41 and preferably fitted into a recess 42 of knob 25. Disc 40 is rotatable relative to knob 25. The rotation disc 40 may be facilitated by finger grips 43 or similar means.

As it will appear from the previous description and the drawings a certain rotation of knob 25 in one or the other direction will cause a corresponding pivotal movement of lever 7 and hence of mirror 2, the axial movement of screw 15 being transmitted through shaft 31 and pin 33 to lever 7. When now the inner disc 40 is rotated within knob 25 the shaft 31 will move axially relative to threaded screw 15 and pin 33 engaged by shaft 30 will change the angular positions of lever 7 and mirror 2 correspondingly. Hence a subsequent rotation of knob 25 through the same angle as before will place mirror 2 in a different angular position, as controlled by the different initial angular position. This feature is utilized to adjust the rangefinder for measuring objects having different known dimensions as will be more fully explained hereinafter.

The entire screw drive as previously described may be placed in a case 50 which also may serve to support the rangefinder case 3 fastened to it by any suitable means such as screws 51.

It should be understood that the levers 8 and 9 shown in Fig. 4 may also be placed in case 50, then the pivotal movements of lever 9 can be transmitted to the mirror 2 by means of extending pivot pin 12 into case 3, or the levers 8 and 9 may be placed in case 3 as it is preferable then pivot pin 10 is extended from this case into case 50 where it is fastened to lever 7.

A pointer 52 is fastened to case 50 by rivets 53, screws or other suitable means or to any other part of the rangefinder stationary relative to the knob 25 for the purpose of indicating the position of the knob in relation to a relatively stationary part. A pin 54 is preferably provided to limit the possible movement of knob 25 to one revolution in either direction.

The rangefinder according to the invention can be calibrated for any given object or target having at least one known dimension by the following procedure:

A base line of the desired length for example thirty foot is marked out on any convenient background. The minimum range is then measured from the base line at ninety degrees (90°) to the base line. The operator now sights through the eyepiece or observation window 6 holding the instrument preferably in horizontal position and rotates knob 25 until the true image of the base line that is visible through the semi-transparent mirror 1 and the reflected image projected upon mirror 1 from mirror 2 appear in an end to end position to the operator. The periphery 26 or another suitable part of the knob 25 is now marked accordingly opposite pointer 52. The next desired range is then measured off and the operator resights the rangefinder for the base line in a similar manner. The knob is again marked to indicate the new range. This procedure is repeated increasing the range as desired until the entire desired range is covered. The knob is now calibrated with a scale permitting measuring the distance of a target having a certain known dimension.

In order to have space for several consecutive scales on the periphery 26 of knob 25 the marks on knob 25 are preferably arranged in such a manner that the calibration relating to one base line of given length covers only a fraction of the periphery of knob 25.

After completion of the previously described calibration the instrument is ready to be calibrated for a second object or target of known length or dimension for example 12 feet. For this purpose a new base line of the desired length is marked out on any convenient background and the minimum range desired is measured from the base line as previously described. The inner disc 40 is then rotated relative to the knob until mirror 2 is placed in an angular position in which the two images appearing on mirror 1 are in a position end to end and the knob is in a position relative to pointer 52 that is convenient for the beginning of the second scale. The second scale is thereupon completed as previously described for the first scale. After the second scale additional scales may be marked in a similar manner. Figs. 1 and 2 show parts of three consecutive scales 55, 56, and 57, and Fig. 6 shows a development of the three scales provided on the periphery of knob 25. The positions of the inner disc relative to the knob are indicated by markings on the disc 40 and a pointer 58 on the knob. Marks for objects having a length of 6, 12 and 30 feet are shown by way of example.

The rangefinder is now ready for use, its operation is as follows:

The inner disc is first set in accordance with the known dimension of the object the distance of which is to be measured. Then the large knob is turned by the operator while viewing the object through the eye piece. As soon as the true image and the reflected image appear in end to end or tandem position the correct distance of the object is indicated on one of the scales by the position of the knob relative to pointer 52.

When a reading for an object having a different known dimension is to be taken the inner disc 40 is indexed to the new object dimension and the operation is repeated.

It should be noted that it is not necessary to set the knob for any definite position when the instrument is indexed for a different object dimension. The knob can be simply rotated until the two images appear in the correct relative position since the images can be brought into this position only in one definite position of the knob irrespective of the starting position of the knob.

The modification shown in Fig. 5 is similar in principle to the design described in connection with Figs. 1 to 4. The difference resides in the means provided for controlling the angular position of mirror 2 caused by a certain rotation of knob 25.

According to Fig. 5 means are provided for altering the position of the bearing point at which lever 7 is engaged while leaving the length of the part engaging the lever unchanged.

For this purpose a member 60, such as a screw is inserted in lever 7. The pin 33 and the shaft 31 may be then omitted and instead of tubular screw 15 a screw 61 having a preferably pointed extension 62 is provided. It is of course also possible to provide a screw 61 extending through the entire length of block 16. Screw 60 supports a knob 63 placed outside of case 50 or fitted into a recess of this case.

As it will appear from the drawings and the previous specification a rotation of knob 63 will move the bottom of bearing 36 toward extension 62 or away from this extension according to the direction of rotation of knob 63. This change in the position of the point of engagement will change the initial angular positions of lever 7 and hence of mirror 2 due to the action of spring 37. In other words the functions of knob 63 and screw 60 are similar to the function of inner disc 40 when turned to change the relative position of tubular screw 15 and shaft 31.

The instrument can be calibrated for objects having different known dimensions in a similar manner as described in connection with Figs. 1 to 4. The correct positions of knob 63 for objects having different dimensions in relation to a pointer 64 fastened to case 50 or any other suitable point stationary relative to knob 63 are then marked on the knob as described for disc 40.

I have found that rangefinders according to my invention can be used to measure distances within a range between comparatively few yards and several thousand yards. The number of objects having different dimensions for which the instrument may be calibrated is limited only by the space that is available on the knob.

The rangefinder according to my invention is useful for many purposes, for example for measuring the distance between bill boards or advertising signs and a street or other point of observation.

Another field of application is the use by an observer stationed in a fast moving airplane who can set the instrument for a target having at least one known dimension such as the known length of the wing span of another airplane and for the desired firing distance for which the guns within the plane may be adjusted. The gunners can then open fire when the instrument indicates that the pre-set distance is reached.

While the invention has been described in detail with respect to certain preferred examples and embodiments it will be understood by those skilled in the art after understanding my invention that various changes and modifications may be made without departing from the spirit and scope of my invention, and it is intended therefore, in the appended claims to cover all such changes and modifications.

What is claimed as new and desired to be secured by Letters Patent is:

1. Rangefinder for measuring the range of objects of which one dimension is known, comprising a stationary semi-transparent reflector and a pivotal reflector for viewing the objects, one image of an object being reflected by said pivotal reflector to said stationary reflector for comparison with a second image of the viewed object produced by direct viewing of the object through the semi-transparent reflector, a pivotal lever operatively coupled with the pivotal reflector, an axially movable member engaging the lever, a spring means for urging the movable member against the lever, said movable member comprising two telescoped elements in threaded engagement, a rotary member for moving both elements of the movable member together, a second rotary member to move one of said elements relative to the other for changing the total length of the movable member thereby adjusting the pivotal position of the lever to the different dimensions of the objects, and several sets of indicating means provided on the rotary members, each set being arranged to indicate the range of an object having a certain known dimension, said sets of indicating means being calibrated to indicate the correct range of the respective objects in response to the movable member length being adjusted for placing the pivotal reflector in an angular position causing the two images of an object to be visible in an end to end position of the stationary reflector.

2. Rangefinder according to claim 1 in which the rotary means are arranged concentrically.

3. Rangefinder for measuring the range of objects of which one dimension is known, comprising a stationary semi-transparent reflector and a pivotal reflector for viewing the objects, one image of an object being reflected by said pivotal reflector to said stationary reflector for comparison with a second image of the viewed object produced by direct viewing of the object through the semi-transparent reflector, a pivotal lever operatively coupled with the pivotal reflector, an axially movable member operatively engaging the lever, said movable member comprising two telescoped elements in threaded engagement, a rotary member for moving both the elements of the movable member together, a second rotary member to move one of said elements relative to the other for changing the total length of the movable member thereby adjusting the pivotal position of the lever to the different dimensions of the objects, several sets of indicating means provided on the first rotary member, each set being arranged to indicate the range of an object having a certain known dimension, said sets of indicating means being calibrated to indicate the correct range of the respective objects in response to the movable member length being adjusted for placing the pivotal reflector in an angular position causing the two images of an object to be visible in an end to end position on the stationary reflector, and second indicating means provided on the second rotary member and controlled by the relative position of the two telescoped elements, said second indicating means being calibrated to indicate the dimension of the object for which the rangefinder is set.

4. Rangefinder according to claim 3 in which the first rotary member comprises a knob having a recess and the second rotary member comprises a disc fitted in said recess.

5. Rangefinder according to claim 3 in which said sets of indicating means comprise scales marked consecutively on the periphery of the first rotary member, separate scales being provided for objects having different dimensions.

6. Range finder for measuring the range of objects one dimension of which is known, comprising a stationary semi-transparent reflector and a pivotal reflector for viewing the objects, one image of a viewed object being reflected by said pivotal reflector to said stationary reflector for comparison with a second image of the viewed object produced by direct viewing of the object through the semi-transparent stationary reflector, a pivotal lever operatively coupled with the pivotal reflector, an axially adjustable shaft operatively engaging the pivotal lever, a means operatively connected with the shaft to effect a given axial movement thereof in response to a given movement of the said means for causing a corresponding angular displacement of the reflector lever, several sets of indicating means associated with the shaft moving means, each set being calibrated to indicate the range of an object having a known dimension when the pivotal lever and hence the pivotal reflector are placed in an angular position in which the two images of a viewed object are viewable in an end to end position on the semi-transparent stationary reflector, a control means for varying the axial length of the shaft thereby varying the angular movement of the pivotal reflector lever in response to a given axial shaft movement, and a second indicating means associated with the control means and calibrated to indicate the shaft length causing an angular reflector movement corresponding to the known dimension of the viewed object thereby permitting a reading of the object range on the set of indicating means assigned to such object dimension.

7. Range finder as described in claim 6 in which said axially movable shaft comprises two relatively movable sections, said shaft moving means being arranged to displace said two sections together in axial direction, and said control means being arranged to move one of said sections independently of the other for varying the axial length of the shaft.

8. Range finder as described in claim 6 in combination with yieldable means for urging the axial shaft into engagement with the pivotal reflector lever.

9. Range finder as described in claim 6 in which said control means comprises a member having a bearing point for the shaft mounted on the reflector lever for displacement in a direction substantially parallel to the shaft axis thereby varying the effective axial length of the shaft between the pivotal lever and the means for the axial shaft movement.

WILLIAM CASTEDELLO.